US012600070B2

(12) United States Patent
Pedersen et al.

(10) Patent No.: US 12,600,070 B2
(45) Date of Patent: Apr. 14, 2026

(54) MOLD TOOL FOR INJECTION MOLDING

(71) Applicant: LEGO A/S, Billund (DK)

(72) Inventors: Flemming Pedersen, Billund (DK); Alex Bojstrup, Billund (DK); Jens Stamp Lambæk, Billund (DK)

(73) Assignee: LEGO A/S, Billund (DK)

( * ) Notice: Subject to any disclaimer, the term of this patent is extended or adjusted under 35 U.S.C. 154(b) by 119 days.

(21) Appl. No.: 18/259,321

(22) PCT Filed: Dec. 22, 2021

(86) PCT No.: PCT/EP2021/087178
§ 371 (c)(1),
(2) Date: Jun. 26, 2023

(87) PCT Pub. No.: WO2022/144259
PCT Pub. Date: Jul. 7, 2022

(65) Prior Publication Data
US 2024/0051205 A1      Feb. 15, 2024

(30) Foreign Application Priority Data
Dec. 29, 2020    (DK) ................................. 202070876

(51) Int. Cl.
*B29C 45/36*        (2006.01)
*B29C 45/33*        (2006.01)
        (Continued)

(52) U.S. Cl.
CPC .............. *B29C 45/36* (2013.01); *B29C 45/33* (2013.01); *B29C 45/44* (2013.01);
        (Continued)

(58) Field of Classification Search
CPC ......... B29C 45/36; B29C 45/33; B29C 45/44; B29C 2045/2683; B29C 2045/4068; B29C 2045/445; B29L 2031/5209
(Continued)

(56) References Cited

U.S. PATENT DOCUMENTS 2,923,035 A      2/1960   Schwartz
5,240,397 A      8/1993   Fay et al.
        (Continued)

FOREIGN PATENT DOCUMENTS

CN          106687274  A      5/2017
DE      102014014388  B3      1/2016
        (Continued)

OTHER PUBLICATIONS

JP Office Action corresponding to Application No. 2022-533529, dated Sep. 10, 2024, 5 pages (Machine Translation).
(Continued)

*Primary Examiner* — Christina A Johnson
*Assistant Examiner* — Xue H Liu
(74) *Attorney, Agent, or Firm* — Day Pitney LLP; George Chaclas; Anthony A. Kassas

(57)        ABSTRACT

An injection molding tool comprising two mold parts arranged for mutual movement along a tool axis between a closed position and an open position. The injection molding tool comprises a first mold core having a mounting end and a core end. Each of the two mold parts, in the closed position, form a mold cavity and a socket adapted for holding the mounting end between the two mold parts, and for releasing the mounting end in the open position. The core end of the first mold core in the closed position, extends along a core axis from the mounting end and into the mold cavity in a transverse direction with respect to the direction of the tool axis, so that the mold cavity forms a tubular space (Continued)

extending axially along the core axis between both of the two mold parts and the core end of the mold core part.

16 Claims, 2 Drawing Sheets

(51) Int. Cl.

| | |
|---|---|
| *B29C 45/44* | (2006.01) |
| *B29C 45/26* | (2006.01) |
| *B29C 45/40* | (2006.01) |
| *B29L 31/52* | (2006.01) |

(52) U.S. Cl.

CPC .................. *B29C 2045/2683* (2013.01); *B29C 2045/4068* (2013.01); *B29C 2045/445* (2013.01); *B29L 2031/5209* (2013.01)

(58) Field of Classification Search

USPC .......................................................... 425/577

See application file for complete search history.

(56) References Cited

U.S. PATENT DOCUMENTS

| | | | |
|---|---|---|---|
| 5,287,970 | A | 2/1994 | Weidt |
| 6,077,470 | A | 6/2000 | Beaumont |
| 6,250,494 | B1 | 6/2001 | Diamond |
| 6,403,003 | B1 | 6/2002 | Fekete et al. |
| 6,503,438 | B2 | 1/2003 | Beaumont et al. |
| 7,666,335 | B2 | 2/2010 | Beaumont |
| 2005/0112309 | A1 | 5/2005 | Soerensen |
| 2006/0261521 | A1 | 11/2006 | Beaumont |
| 2016/0121525 | A1 | 5/2016 | Antier et al. |

FOREIGN PATENT DOCUMENTS

| | | | |
|---|---|---|---|
| EP | 0370142 | A1 | 5/1990 |
| EP | 3028756 | A1 | 6/2016 |
| JP | H1058491 | A | 3/1998 |
| JP | 2002192561 | A | 7/2002 |
| JP | 2010111014 | A | 5/2010 |
| JP | 2013193396 | A | 9/2013 |
| KR | 100530028 | B1 | 11/2005 |
| KR | 1020120051276 | A | 3/2013 |
| KR | 101462101 | B1 | 11/2014 |
| WO | 2012009653 | A1 | 1/2012 |
| WO | 2014105661 | A1 | 7/2014 |

OTHER PUBLICATIONS

DK First Technical Examination corresponding to PA202070876, dated Jul. 15, 2021, 7 pages.

International Search Report and Written Opinion in corresponding International Application No. PCT/EP2021/087178, dated Apr. 19, 2022, 14 pages.

Bhandari, Kajal, "Designing lego brick and its mould for manufacturing" URL: https://www.theseus.fi/bitstream/10024/111578/1/Lego%20Thesis.pdf (Apr. 20, 2016) XP055908702, pp. 1-80.

EP 71(3) Communication corresponding to Application No. 21843966.9, dated May 22, 2025, 21 pages.

CN Search Report corresponding to Application No. 2021800881981, dated Sep. 26, 2025, 2 pages.

MOLD TOOL FOR INJECTION MOLDING

CROSS-REFERENCE

The present application is a U.S. National Stage Application of International Application No. PCT/EP2021/087178, filed on Dec. 22, 2021 and published on Jul. 7, 2022 as WO 2022/144259 A1, which claims the benefit and priority of Danish Patent Application No. 202070876, filed on Dec. 29, 2020, each of which is incorporated herein by reference in its entirety for any purpose whatsoever.

FIELD OF THE DISCLOSURE

The present disclosure relates to an injection molding tool configured for automated molding of plastic items, said injection-molding tool comprising at least two separate mold parts arranged so that they can be mutually moved in a direction along a tool axis between a closed position where they are abutting each other along a mold parting plane and an open position where they are away from each other, and where the injection molding tool further comprises a first separate mold core having a mounting end and a core end and where each of the two separate mold parts in the closed position comprises a cavity together forming a mold cavity and a socket adapted for holding the mounting end of the first separate mold core in a fixed position between the two mold parts and for releasing it when it is in the open position.

BACKGROUND

In conventional injection molding tools it is very common to arrange a cavity in one of the two mold parts (the cavity part) and a corresponding mold core on the other one of the two mold parts (the core part). When the two mold parts are moved to the open position of the molding tool during a molding cycle, the molded product, due to e.g. friction and shrinkage of the molded plastic material, tends to stick to the core. Therefore, it is often necessary to strip the product from the core using e.g. one or more ejector pins when it is sufficiently set or hardened.

In this relation it is mostly necessary to design both the cavity side and the core side of the mold with draft angles in order to reduce the necessary force required for removing the product from the mold. Such draft angles, however, will also be present on the molded product and may reduce the functionality of the molded product.

This is especially the case when injection molding products comprising tubular parts such as e.g. toy building blocks that can be interconnected by having tubular coupling parts frictionally engaging with correspondingly shaped coupling parts on another building block.

U.S. Pat. No. 2,923,035 discloses an injection molding tool as mentioned in the introduction. In the disclosure, an insert is arranged in the injection molding tool so that multiple products are molded onto a set of taps arranged on the insert. The insert provides easy transfer of the multiple products attached to it from one injection molding tool to another in a two-step molding process.

SUMMARY

It is the object of the present disclosure to provide an injection molding tool providing the option of injection molding especially products comprising tubular parts with reduced or even without need for draft angles in order to remove the molded products from the mold. In this relation the term tubular parts is understood as covering any part of the product shape as a tube with any cross section such as circular, square, triangular, rectangular polygonal, elliptical or the like as such tubular shapes are normally molded over a mold core.

This is accomplished by the present disclosure by employing a core end of the first separate mold core in the closed position to extend along a core axis from the mounting end and into the mold cavity in a transverse direction with respect to the direction of the tool axis, such that that the mold cavity forms a tubular space extending axially along the core axis and between both of the two separate mold parts and the core end of the mold core part.

Thereby the first separate mold core may be released after a molding cycle from between the two mold parts in the open position of the injection molding tool along with the product that is attached to the core end of the first separate mold core. Thereafter, the molded product can be released from the first separate mold core when it is fully set or hardened.

In this relation, the orientation of the core axis is defined by the direction by which the molded product is removed from the core end of the first separate mold core, and by having the core axis oriented transverse to the tool axis then the requirement of having draft angles on the core as well as the mold cavities are significantly reduced or even eliminated.

In a preferred embodiment of the injection molding tool, a second separate mold core has a mounting end and a core end and the cavity of each of the two separate mold parts in the closed position further forms a second socket adapted for holding the mounting end of the second separate mold core in a fixed position, opposite to the first separate mold core and between the two mold parts and for releasing it when it is in the open position, so that the core end of the second mold core part in the closed position extends from the mounting end and into the mold cavity in a transverse direction with respect to the direction of the tool axis.

In this relation, the distal end of the second separate mold core, in the closed position, together with the first separate mold core and the two separate mold parts preferably form one or more tubular spaces in the mold cavity.

In a further preferred embodiment the mold cavity further extends in front of the distal end of the core end of the first separate mold core.

The first separate mold core may advantageously also comprise a mold ejector pin extending in the first separate mold core along the core axis.

The injection molding tool may advantageously comprise multiple separate mold cavities and a corresponding number of first separate mold cores each extending into one of the mold cavities, and wherein the first separate mold cores are interconnected via a first supporting element.

In this relation, the injection molding tool may further comprise a second separate mold core for each mold cavity, the second separate mold cores being interconnected via a second supporting element.

The first and the second supporting elements may advantageously be interconnected to form a single frame structure so that multiple molded product can easily be removed simultaneously from the injection molding tool.

In this relation, at least a part of the frame structure may preferably extend outside the two separate mold parts.

The injection molding tool according to the disclosure is especially advantageous for molding toy building blocks where the mold cavity in the closed position forms a substantially closed space shaped for injection molding of such toy building blocks comprising a tubular coupling part, and where the parts of the mold cavity forming the tubular coupling part extends along the core axis of the first separate mold core.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figures 1, 2:
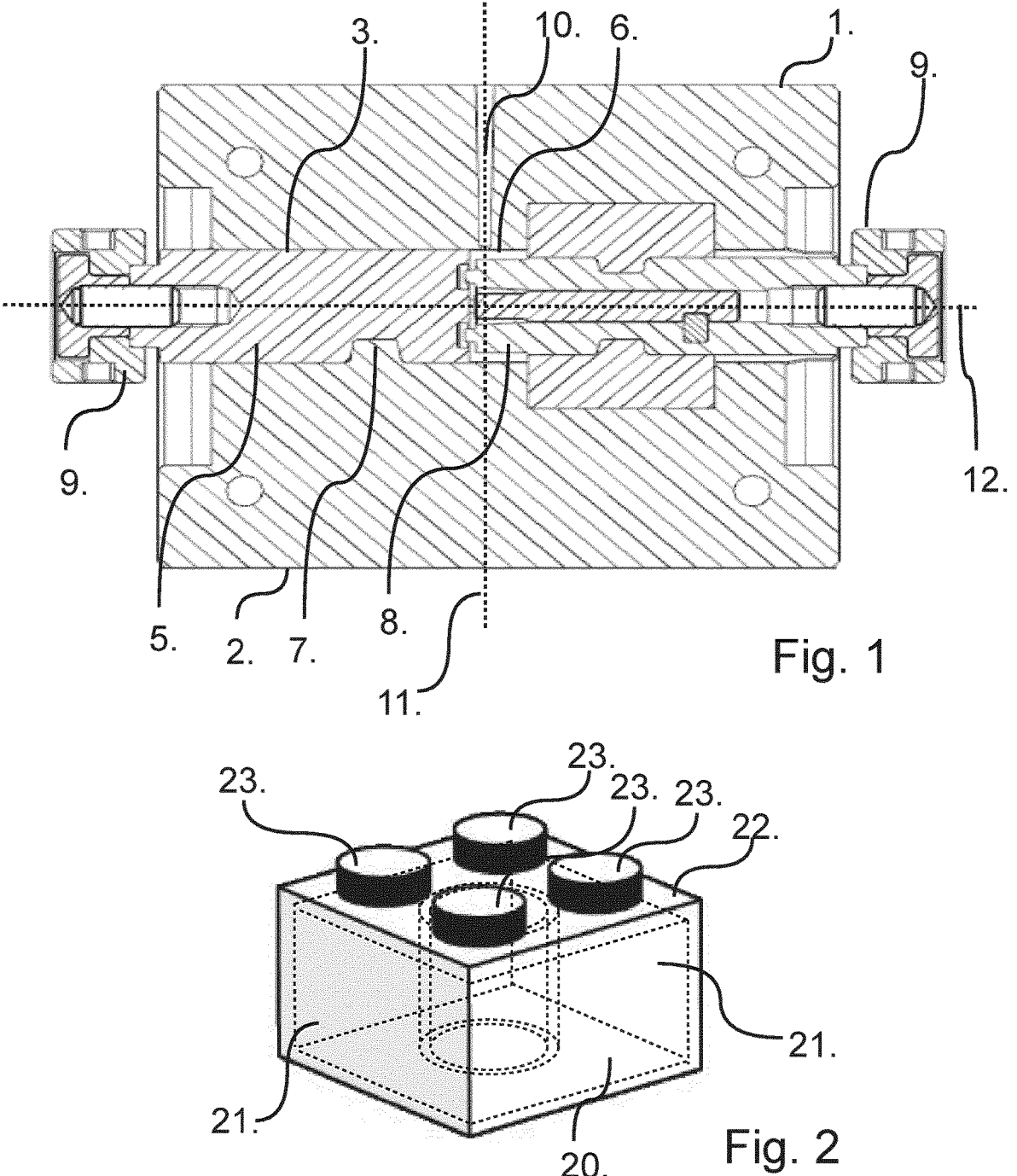
FIG. 1 is a principle drawing showing a cross section of the embodiment of the injection molding tool.
FIG. 2 is a perspective drawing showing the product that is molded in the injection molding tool of FIG. 1.

The subject technology overcomes many of the prior art problems associated with mold tools for injection molding. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 3:
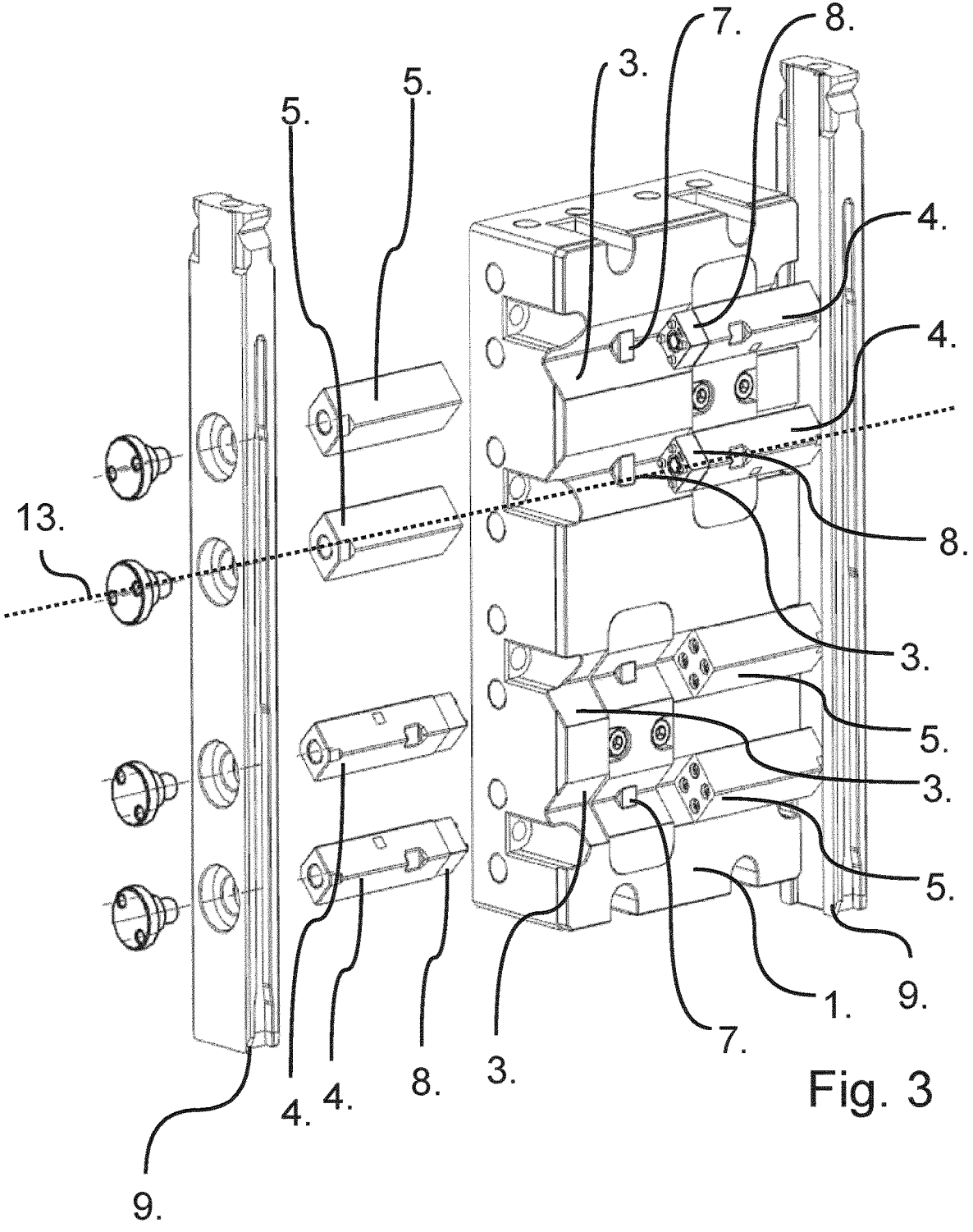
FIG. 3 is a perspective drawing showing a partly exploded view of the injection molding tool of FIG. 1.

FIGS. 1 and 3 show an embodiment of the present disclosure adapted for injection molding a toy building block as shown in FIG. 2. In FIG. 1, a cross section of the injection molding tool is shown in the closed position where molten or fluid plastic material is injected via the injection nozzle 10, and in FIG. 3, parts of the same injection molding tool are shown in a perspective and partly exploded drawing.

The injection molding tool comprises two separate mold parts 1, 2 arranged opposite to each other. The two separate mold parts 1, 2 are arranged so that they can be mutually shifted in the direction along the tool axis 11 between a closed position as shown in FIG. 1 and to an open position shown in FIG. 3. In the closed position, the two separate mold parts 1, 2 are abutting each other in the mold parting plane illustrated by the punctured line 12 in FIG. 1.

According to this embodiment of the disclosure, the two separate mold parts 1, 2 each have a cavity 3 forming the exterior part of the mold cavity 6 and sockets 7 for holding the first and the second separate mold cores 4, 5 in a fixed position between the two separate mold parts 1, 2 in the closed position, as shown in FIG. 1, and for releasing the first and the second mold cores 4, 5 as shown in FIG. 3.

As mentioned, the two mold parts 1, 2 and the first and the second mold cores 4, 5 together forms the mold cavity 6. In this relation the first separate mold cores 4 each have a core end 8 forming the interior space 20, while the two separate mold parts 1, 2 and the core end 8 thereby forms the side flanges 21 on the building block shown in FIG. 2. The first separate mold cores 4 and the second separate mold core 4 forms the upper side 22 and the knobs 23 on the building block.

In this relation, the side flanges 21 thereby form a tubular part of the building block, and as these side flanges 21 extend around the core end 8 of the first separate mold cores 4, the building block can be removed from the core end 8 at any time after releasing the first separate mold core 4 from between the two separate mold parts 1, 2 as shown in FIG. 3.

Thereby, it is possible to leave the molded building blocks between the first and the second mold cores 4, 5 after releasing the first and the second separate mold cores 4, 5 from between the two separate mold parts 1, 2. This allows that a new set of first and second separate mold cores can be arranged between the two separate mold parts 1, 2, so that a new molding cycle can be performed even if the earlier molded building blocks are not yet removed from the first and the second separate mold cores 4, 5.

As the tubular end of the building block formed by the flanges 21 extend parallel to the core axis 13 of the first separate mold cores 4, it is not necessary to have core parts or ejectors on the two separate mold parts 1, 2. This provides the option of removing the molded building blocks much earlier.

Furthermore multiple first and second separate mold cores 4, 5 may be arranged on a common support 9, e.g. a single frame, so that it is possible to move them all simultaneously from between the two separate mold parts 1, 2 and this facilitates that the building can be held between the first and the second mold cores 4, 5, e.g. for subsequent decoration or two step molding or other handling, prior to releasing the molded element from the core 4.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

The invention claimed is:

1. An injection molding tool configured for automated molding of plastic items, said injection-molding tool comprising:
   at least two separate mold parts arranged for mutual movement in a direction along a tool axis between a closed position, where the separate mold parts are abutting each other along a mold parting plane, and an open position, where separate mold parts are away from each other,
   wherein the injection molding tool further comprises a first separate mold core having a mounting end and a core end,
   wherein each of the two separate mold parts in the closed position comprises a cavity together forming a mold cavity and a socket adapted for holding the mounting end of the first separate mold core in a fixed position between the two mold parts, and for releasing the mounting end of the first separate mold core when it is in the open position, wherein the core end of the first separate mold core in the closed position extends along a core axis from the mounting end and into the mold cavity in a transverse direction with respect to the direction of the tool axis, such that the mold cavity forms a tubular space extending axially along the core axis and between both of the two separate mold parts and the core end of the first separate mold core.

2. The injection molding tool according to claim 1, further comprising a second separate mold core having a mounting end and a core end, wherein the cavity of each of the two separate mold parts in the closed position further forms a second socket adapted for holding the mounting end of the second separate mold core in a fixed position opposite to the first separate mold core and between the two mold parts and for releasing the mounting end of the second separate mold core when it is in the open position, so that the core end of the second mold core part in the closed position extends from the mounting end and into the mold cavity in a transverse direction with respect to the direction of the tool axis.

3. The injection molding tool according to claim 2, wherein the core end of the second separate mold core, in the closed position, together with the first separate mold core and the two separate mold parts, forms one or more tubular spaces in the mold cavity.

4. The injection molding tool according to claim 1, wherein the mold cavity further extends in front of the core end of the first separate mold core.

5. The injection molding tool according to claim 1, wherein the first separate mold core comprises a mold ejector pin extending in the first separate mold core along the core axis.

6. The injection molding tool according to claim 1, wherein the injection molding tool comprises multiple separate mold cavities and a corresponding number of first separate mold cores each extending into one of the mold cavities, and wherein the first separate mold cores are interconnected via a first supporting element.

7. The injection molding tool according to claim 6, further comprising a second separate mold core for each mold cavity, wherein the second separate mold core are interconnected via a second supporting element.

8. The injection molding tool according to claim 7, wherein the first and the second supporting elements are interconnected to form a single frame structure.

9. The injection molding tool according to claim 8, wherein at least a part of the frame structure extends outside the two separate mold parts.

10. The injection molding tool according to claim 1, wherein the mold cavity in the closed position forms a substantially closed space shaped for injection molding toy building blocks comprising a tubular coupling part, and

wherein the parts of the mold cavity forming the tubular coupling part extends along the core axis of the first separate mold core.

11. An injection molding tool comprising:
a first mold plate;
a second mold plate complementary to the first mold plate, the second mold plate configured for axial movement along a tool axis between a closed position, abutting the first mold plate, and an open position, distanced from the first mold plate; and
a first mold core shaped to form molded building blocks, the first mold core defining a mounting end,
wherein the first and second mold plate define a mold cavity having a tubular socket transverse the tool axis, the tubular socket configured for:
holding the mounting end of the first mold core in a fixed position between the first and second mold plate in the closed position, and
releasing the mounting end of the first mold core in the open position.

12. The injection molding tool according to claim 11, further comprising a second mold core also shaped to form molded building blocks and defining a mounting end, the tubular socket configured for holding the mounting end of the second mold core in a fixed position between the first and second mold plate in the closed position, and along the same axis as the first mold core, the tubular socket further configured for releasing the mounting end of the second mold core in the open position.

13. The injection molding tool according to claim 11, further comprising a mounting support bracket for delivering the first mold cold core to the tubular socket.

14. An injection molding tool comprising:
a first and second injection molding plate configured to clamp together to a closed position during an injection molding process, the first and second injection molding plate defining a tubular socket in the closed position, the first injection molding plate defining an injection nozzle therethrough to access the tubular socket; and
a mold core configured for positioning in the tubular socket, the mold core shaped to form molded building blocks,
wherein upon injection of molten plastic into the injection nozzle while the first and second injection molding plate are in the closed position, the mold core is configured to shape a molded building block from the molten plastic, and, upon opening first and second injection molding plate from the closed position, the injection molding tool ejects the mold core and the molded building block.

15. The injection molding tool according to claim 14, further comprising a second mold core also shaped to form molded building blocks, the tubular socket configured for holding and ejecting the second mold core.

16. The injection molding tool according to claim 14, further comprising a mounting support bracket for delivering the mold core to the tubular socket.

* * * * *